United States Patent [19]

Imada et al.

[11] 4,185,959
[45] Jan. 29, 1980

[54] METHOD FOR DYEING HYDROPHOBIC FIBER MATERIAL WITH DISPERSE DYE

[75] Inventors: Kunihiko Imada, Toyonaka; Katsumasa Ohtake, Kitakatsuragi; Taizo Ohshima, Tondabayashi; Sanae Sakaguchi, Suita, all of Japan

[73] Assignee: Sumitomo Chemical Company, Limited, Osaka, Japan

[21] Appl. No.: 753,894

[22] Filed: Dec. 23, 1976

[30] Foreign Application Priority Data

Dec. 29, 1975 [JP] Japan .................. 50-157305

[51] Int. Cl.² .................. C09B 27/00; D06P 1/00
[52] U.S. Cl. .................. 8/26; 8/25; 162 R
[58] Field of Search .................. 8/25, 26

[56] References Cited
U.S. PATENT DOCUMENTS 3,042,476  7/1962  Rohner .................. 8/25

OTHER PUBLICATIONS

Wyszecki, G. and Stiles, W. S., "Color Science", (Wiley, New York), 1967, p. 325.
Sumitomo Technical Information,–Rapid Dyeing System of Polyester by Sumikaron Dyes (Sumitomo Chemical Co. Ltd.).
Vickerstaff, T., "The Physical Chemistry of Dyeing", (Oliver and Boyd, London), 1950, pp. 45 and 370-374.
Bayer Farben Revue, Special Edition, No. 3/1, "Color Measurement in the Textile Industry", (1971).

Primary Examiner—A. Lionel Clingman
Attorney, Agent, or Firm—Stevens, Davis, Miller & Mosher

[57] ABSTRACT

A hydrophobic fiber material is dyed in a dye bath containing at least nine disperse dyes having different chemical structures from one another within a short period of time with a good levelness.

12 Claims, 9 Drawing Figures

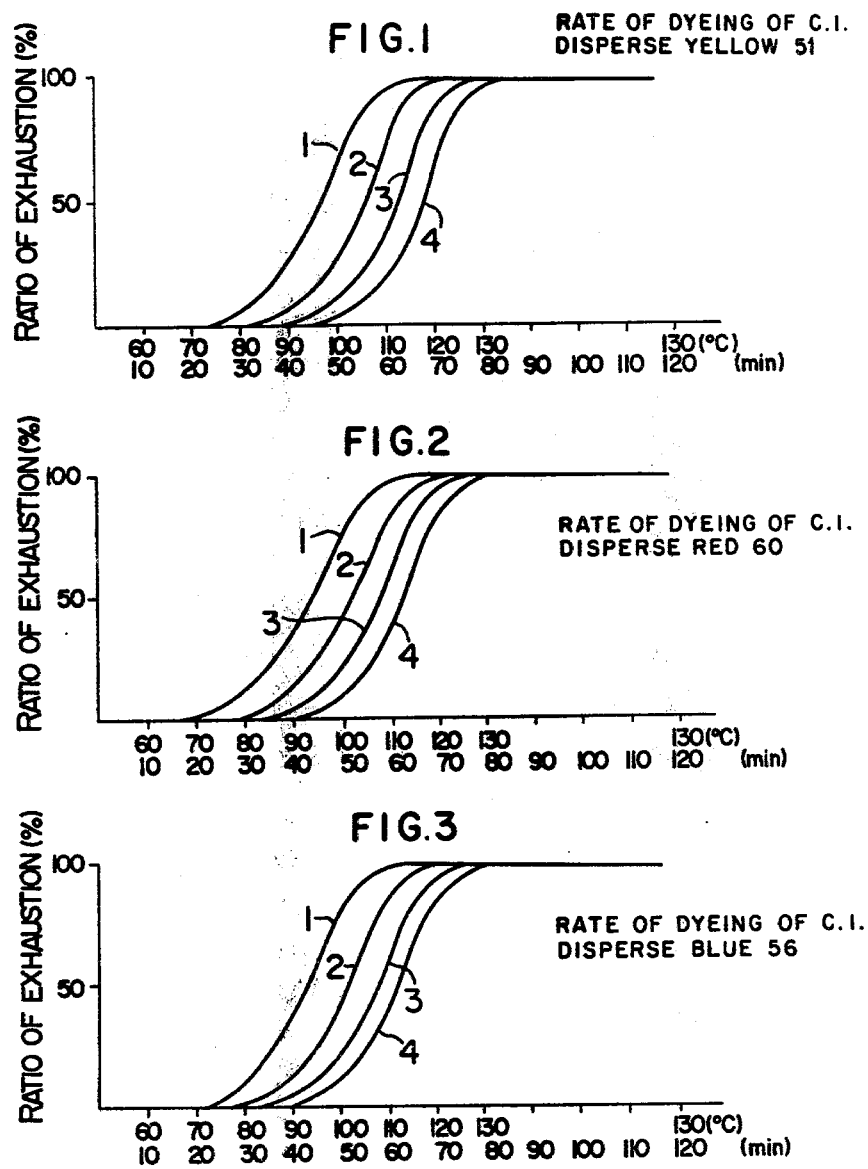

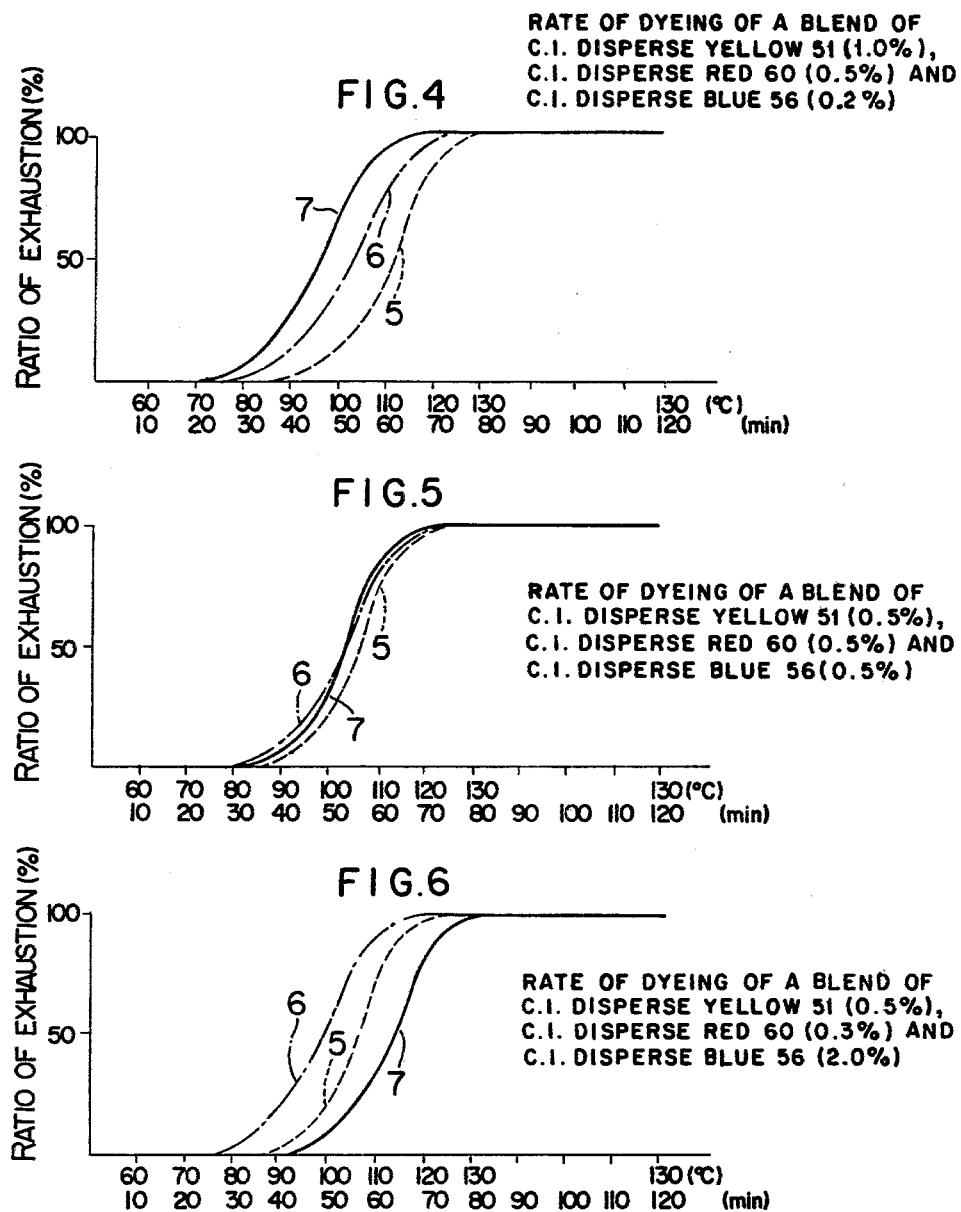

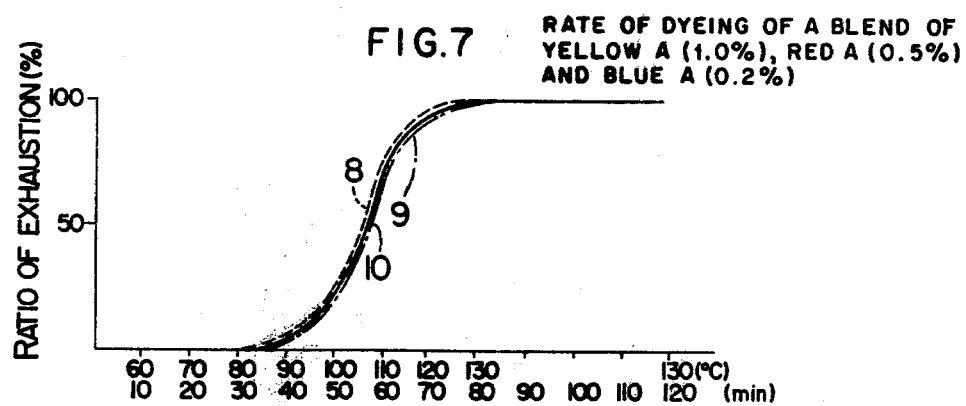
FIG.7 RATE OF DYEING OF A BLEND OF YELLOW A (1.0%), RED A (0.5%) AND BLUE A (0.2%)
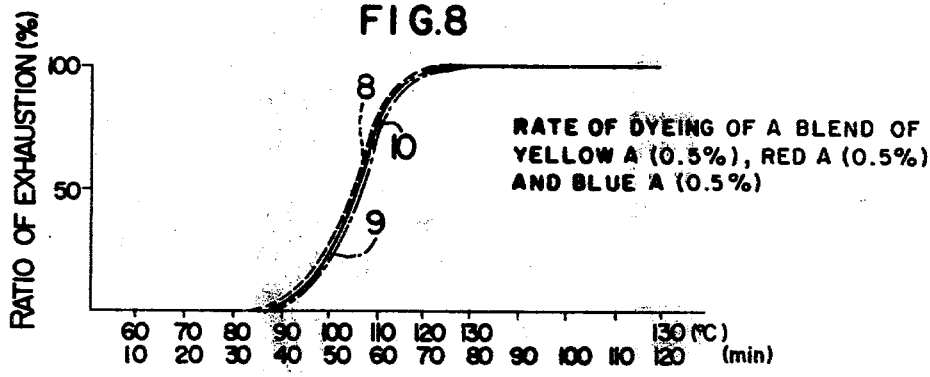
FIG.8 RATE OF DYEING OF A BLEND OF YELLOW A (0.5%), RED A (0.5%) AND BLUE A (0.5%)
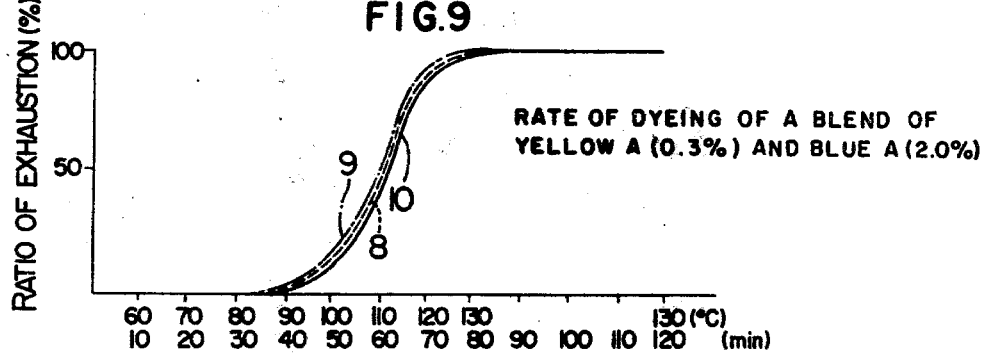
FIG.9 RATE OF DYEING OF A BLEND OF YELLOW A (0.3%) AND BLUE A (2.0%)

METHOD FOR DYEING HYDROPHOBIC FIBER MATERIAL WITH DISPERSE DYE

The present invention relates to a method for dyeing hydrophobic fiber materials uniformly with a blend of disperse dyes in a short period of time.

There are two methods for obtaining levelness in dyeing synthetic fibers with disperse dyes. One method comprises regulating a dyeing rate of a dye according to a mechanical dyeing ability of dyeing equipments to distribute the dye as uniformly as possible on the fibers from the initial stage of dyeing. The other method makes use of the fact that disperse dyes have a high degree of migration as compared with other kinds of ionic dyes. In the latter method, levelness is obtained by the migration of dye while the bath is being kept at the dyeing temperature, even though the dye distribution is somewhat non-uniform at the initial stage of dyeing. Commercial dyeing is, in fact, carried out by spending a long period of time safely but wastefully combining both methods.

In order to attain levelness as rapidly as possible with disperse dyes conventionally used in industry, it is most efficient to regulate the dyeing rate of dye. When a single dye is used for dyeing, levelness is attained relatively easily by properly regulating the dyeing rate by controlling the condition of the temperature-increase program or by using dyeing assistants. In the usual commercial dyeing, however, it is very rare to carry out the dyeing with a single dye. In most cases, a blend of several dyes are used for dyeing in order to obtain dyed materials having a wide range of color shade and it is usual to use a blend of three primary dyes, i.e., yellow dyes, red dyes and blue dyes. When the dyeing rates of each component dye in the three primary dyes are different from one another, the dyeing operation becomes troublesome because it is necessary to regulate the dyeing conditions, such as the temperature-increase program, depending upon the dyeing rate of each of the respective component dyes. Further, it takes a long period of time for dyeing using blends of dyes as compared with dyeing using a single dye. Accordingly, it is desired that the dyeing rates of each component dye are similar to one another and that the combination of the dyes has dyeing compatibility good enough to be treatable as a single dye. However, various combinations over a wide range of color shade, each of which is satisfactory in dyeing compatibility, can hardly be obtained by varying only the proportion of a component dye in a fixed set of three primary dyes, as is well known from Textile Chemist and Colorist, Vol. 2, No. 20, 350 (1970) and Senshoku Kogyo, Vol. 21, No. 3, 139 (1973).

In dyeing synthetic fibers with disperse dyes, the dyeing rate depends upon the dyeing concentration, in other words, the dyes are exhausted at a relatively low temperature in a pale shade dyeing while they are exhausted at a higher temperature as the dyeing concentration becomes higher as is shown in FIGS. 1, 2 and 3. Further, in a combination dyeing, the dyeing rate of the combination is similar to that of each component dye as is shown in FIGS. 4, 5 and 6. Consequently, the range of color shade obtained with good compatibility from the combination of a fixed set of three primary dyes is limited in principle. For example, in a combination dyeing using C.I. Disperse Yellow 51, C.I. Disperse Red 60 and C.I. Disperse Blue 56 as three primary dyes, relatively good dyeing compatibility is obtained when the dyes are blended in such a proportion as to produce a gray color, as in FIG. 5, while the compatibility becomes poor when the dyes are blended so as to produce color, shades other than a gray color as in shown in FIGS. 4 and 6.

At present, therefore, in order to obtain blends of disperse dyes having good dyeing compatibility over a wide range of color shade, it is common, as is described in Senshoku Kogyo, Vol. 21, No. 3, 137–146 (1973), to previously prepare several kinds of the combination from various sets of three primary dyes having different dyeing rates from one another and to select one combination from them which produces a desired color shade with good compatibility.

When dyeing factories employ this method, however, they meet with economical and technical difficulties, because they should have various kinds of three primary dyes and because dye selection for color matching is troublesome. Consequently, this method is used in practice only by a few well-controlled, biggest dyeing factories. In most factories, at present, it is common to use the dye blends of poor compatibility and to spend a long period of time to obtain levelness.

The present inventors have extensively studied to overcome such inherent properties of disperse dyes and to obtain good compatibility over a wide range of color shade using a set of three primary disperse dyes as in the case of cationic dyes and acidic dyes. As a result, it has been found that, when dyeing is carried out in a bath containing at least nine disperse dyes having different chemical structures from one another, good compatibility is always obtained even if color matching is conducted to obtain a wide range of color shade by changing the blending ratios of the component dyes.

The present invention provides a method for dyeing a hydrophobic fiber material, which comprises contacting said fiber material with a dye bath containing a combination of at least nine disperse dyes having different chemical structures from one another.

The present invention is based on a novel finding that the combination of at least nine disperse dyes can give good compatibility on dyeing of hydrophobic fiber materials over a wide range of color shade, and therefore all disperse dyes which are commercially available and known from any literature can be employed in the method of the present invention. Examples of the commercially available dyes are those listed in the section, "Disperse Dye", of Colour Index, 3rd edition (published by Society of Dyers and Colourists). Of these, the disperse dyes favorably used in the present method include those having the following formulae:

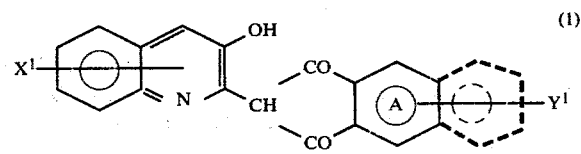

wherein $X^1$ is hydrogen or halogen, $Y^1$ is hydrogen, $C_1$-$C_4$ alkyl, $C_1$-$C_4$ alkoxy or —$COOR^1$ in which $R^1$ is $C_1$-$C_4$ alkyl, and A is a benzene or a naphthalene nucleus,

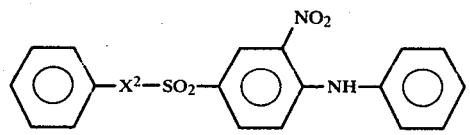
(2)

wherein $X^2$ is —NHCH$_2$— or —NH—,

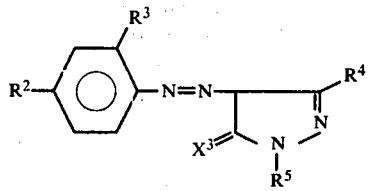
(3)

wherein $R^2$ and $R^3$ may be the same or different and are each hydrogen, halogen, —CN, —NO$_2$, C$_1$–C$_4$ alkyl, —SO$_2$R$^6$ or —COOR$^6$ in which R$^6$ is C$_1$–C$_4$ alkyl, R$^4$ is C$_1$–C$_4$ alkyl, phenyl unsubstituted or substituted by halogen, C$_1$–C$_4$ alkyl, C$_1$–C$_4$ alkoxy, —COOR$^7$ in which R$^7$ is C$_1$–C$_4$ alkyl, —NH$_2$ or —NHCOOR$^8$ in which R$^8$ is C$_1$–C$_4$ alkyl, R$^5$ is hydrogen, C$_1$–C$_4$ alkyl,

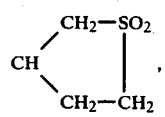

—CH$_2$CH(OR$^9$)CH$_2$OR$^{10}$ in which R$^9$ is hydrogen, C$_1$–C$_4$ alkyl or —COCH$_3$, and R$^{10}$ is C$_1$–C$_4$ alkyl or phenyl unsubstituted or substituted by C$_1$–C$_4$ alkyl, C$_1$–C$_4$ alkoxy or halogen, and X$^3$ is oxygen or imino;

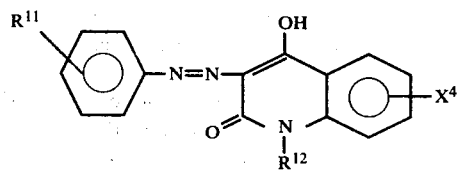
(4)

wherein R$^{11}$ is hydrogen or —NO$_2$, R$^{12}$ is hydrogen or C$_1$–C$_4$ alkyl, and X$^4$ is hydrogen or halogen;

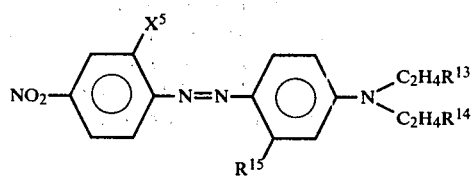
(5)

wherein R$^{13}$ and R$^{14}$ may be the same or different and are each hydrogen, hydroxy, cyano, C$_1$–C$_3$ alkyl, C$_1$–C$_4$ alkoxy, —OCOR$^{16}$, —OCOOR$^{16}$ in which R$^{16}$ is C$_1$–C$_4$ alkyl or phenyl, or phenyl unsubstituted or substituted by halogen, hydroxy, C$_1$–C$_4$ alkyl or C$_1$–C$_4$ alkoxy, R$^{15}$ is hydrogen, C$_1$–C$_4$ alkyl or —NHCOR$^{17}$ in which R$^{17}$ is C$_1$–C$_4$ alkyl or phenyl, and X$^5$ is halogen or cyano;

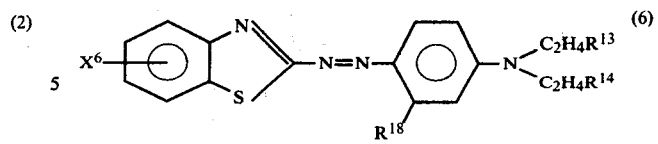
(6)

wherein R$^{13}$ and R$^{14}$ are as defined above, R$^{18}$ is C$_1$–C$_4$ alkyl, and X$^6$ is 1 to 3 halogens, nitro, —SO$_2$CH$_3$ or —SCN;

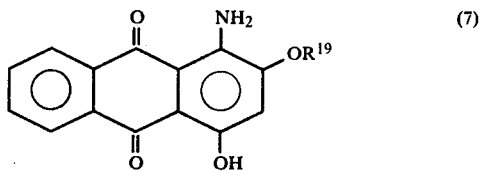
(7)

wherein R$^{19}$ is C$_1$–C$_6$ alkyl, hydroxy-C$_1$–C$_6$ alkyl,

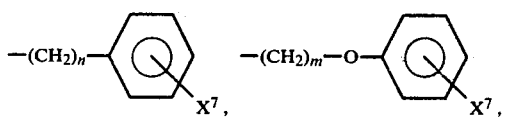

wherein n is an integer of 1 to 4, m is an integer of 1 to 4 and X$^7$ is hydrogen, hydroxy, halogen, C$_1$–C$_4$ alkyl, C$_1$–C$_4$ alkoxy or hydroxy-C$_1$–C$_4$ alkyl, or phenyl unsubstituted or substituted by halogen, hydroxy, C$_1$–C$_4$ alkyl, C$_1$–C$_4$ alkoxy, hydroxy-C$_1$–C$_4$ alkyl, —OCOOR$^{20}$ in which R$^{20}$ is C$_1$–C$_6$ alkyl, —(CH$_2$)$_{n'}$, —COOR$^{21}$, —O—(CH$_2$)$_{n'}$—COOR$^{21}$ in which R$^{21}$ is C$_1$–C$_4$ alkyl and n' is an integer of 1 to 4,

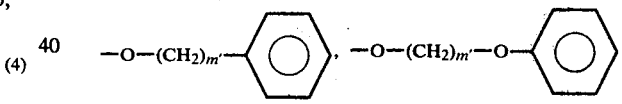

in which m' is an integer of 1 to 4, —S—(CH$_2$)$_{n''}$OR$^{22}$, —SO$_2$NH(CH$_2$)$_{n'''}$—OR$^{22}$ in which R$^{22}$ is hydrogen or C$_1$–C$_4$ alkyl, and n'' is an integer of 1 to 4,

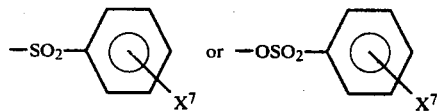

in which X$^7$ is as defined above;

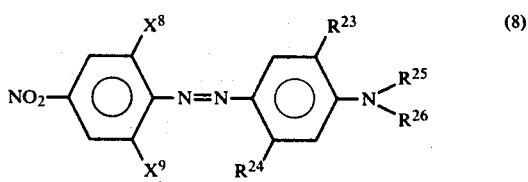
(8)

wherein R$^{23}$ is hydrogen, C$_1$–C$_4$ alkyl or C$_1$–C$_4$ alkoxy, R$^{24}$ is —NHCOR$^{27}$ in which R$^{27}$ is C$_1$–C$_4$ alkyl or phenyl, R$^{25}$ and R$^{26}$ may be the same or different and are each hydrogen, C$_1$–C$_6$ alkyl, hydroxy-C$_1$–C$_6$ alkyl, —(CH$_2$)$_{n'''}$OR$^{28}$, —(CH$_2$)$_{n'''}$OCOR$^{28}$, —(CH$_2$)$_{n'}$-

—OCOOR$^{28}$ in which R$^{28}$ is hydrogen, C$_1$–C$_4$ alkyl or phenyl and n''' is an integer of 1 to 4, —(CH$_2$)$_{n''''}$CH(OR$^{29}$)(CH$_2$)$_{m'''}$OR$^{30}$ in which R$^{29}$ is hydrogen, C$_1$–C$_4$ alkyl or phenyl, R$^{30}$ is hydrogen, C$_1$–C$_4$ alkyl or phenyl, and n'''' and m''' are each an integer of 1 to 4, X$^8$ is halogen, cyano or nitro, and X$^9$ is cyano, halogen or nitro;

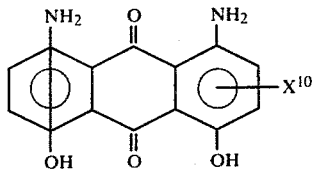
(9)

wherein X$^{10}$ is halogen or

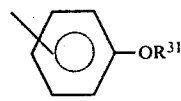

in which R$^{31}$ is C$_1$–C$_4$ alkyl, acyl, —COR$^{32}$ or —CONHR$^{32}$ in which R$^{32}$ is C$_1$–C$_4$ alkyl or phenyl;

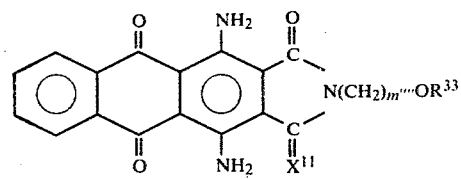
(10)

wherein R$^{33}$ is C$_1$–C$_6$ alkyl, hydroxy —C$_1$–C$_6$ alkyl or phenyl, X$^{11}$ is oxygen or imino, and m'''' is an integer of 1 to 6;

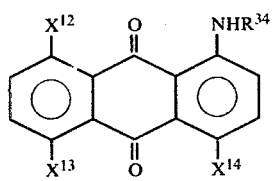
(11)

wherein R$^{34}$ is C$_1$–C$_4$alkyl or phenyl unsubstituted or substituted by halogen, C$_1$–C$_4$alkyl, C$_1$–C$_4$alkoxy or hydroxy-C$_1$–C$_4$ alkyl, and X$^{12}$, X$^{13}$ and X$^{14}$ may be the same or different and are each hydrogen, hydroxy, amino, nitro or NHR$^{34}$ in which R$^{34}$ is as defined above; and

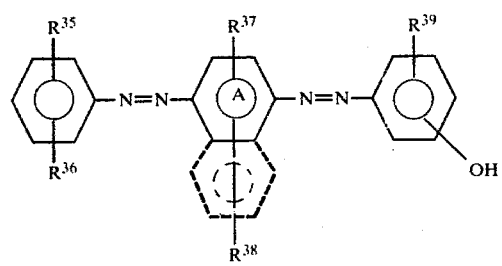
(12)

wherein R$^{35}$ and R$^{36}$ may be the same or different and are each hydrogen, hydroxy, C$_1$–C$_4$alkyl, C$_1$–C$_4$alkoxy, nitro or halogen, R$^{37}$, R$^{38}$ and R$^{39}$ may be the same or different and are each hydrogen, C$_1$–C$_4$alkyl or C$_1$–C$_4$alkoxy, and A is as defined above.

In carrying out the method of the present invention, at least nine dyes may be added separately to a dyeing bath, or may be blended to prepare a blended dye composition. The combinations of up to thirty dyes provides commercially satisfactory results.

In the present invention, when two dyes have chemical structures which have the same basic skeleton but are slightly different locally, for example, the terminal substituents connecting to the basic skeleton are slightly different from each other (e.g. difference in the number of carbon atoms constituting an alkyl or alkoxy group is only about one), and moreover when a blend of the two dyes has an eutectic point, the two dyes are regarded as separate ones, while when the eutectic point is not present, they are regarded as one dye in a pair.

For example, a combination of the following Dye I and Dye II has no eutectic point and therefore they are regarded as one dye even if mixed together, while the combination of Dye II and Dye III has an eutectic point and therefore they are treated as separate ones.

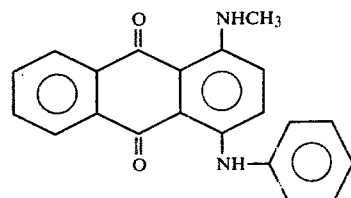
(Dye I)

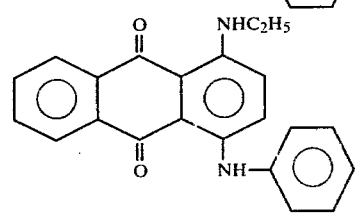
(Dye II)

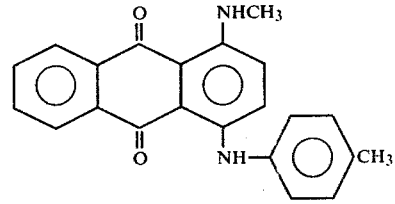
(Dye III)

It is of course possible to use a blend of Dye I and Dye II in practice as one dye.

In the present invention, it is preferred to use three primary dyes to obtain a wide range of color shade. As the three primary dyes, brilliant yellow, red and blue dyes are generally used in most cases. In the present invention, however, orange dyes and yellowish brown dyes are used as a yellow component in addition to the three primary dyes. Similarly, rubine dyes and reddish brown dyes are used as a red component and dark blue dyes, olive dyes and bluish gray dyes are used as a blue dye, in addition to the three primary dyes. An intermediate color dyes such as olive dyes and brown dyes which are prepared previously by blending two or more dyes can be used. The present invention will be illustrated hereinafter with reference to the combination of three primary dyes which is most widely applied.

The yellow component of the three primary colors is prepared by blending at least three yellow dyes having different chemical structures from one another. A hydrophobic fiber material dyed with one of these yellow dyes is within a dominant wave length of 560 to 600 nm to CIE illuminant C in the 1931 CIE system, when the material is dyed to approximately the same depth as in JIS L 0808 Table. Similarly, the red component of the three primary colors is prepared by blending at least three red dyes having different chemical structures from one another. A hydrophobic film material dyed with one of these red dyes is within a dominant wavelength of 600 to 770 nm or a complementary wavelength of less than 560 nm. Further, the blue component of the three primary colors is prepared by blending at least three blue dyes having different chemical structures from one another. A hydrophobic fiber material dyed with one of these blue dyes is within a dominant wavelength of 495 to 380 nm or a complementary wavelength of more than 560 nm. When the yellow, red and blue components thus prepared are used for color matching as three primary dyes, at least nine dyes are finally present in the dyeing bath, and good dyeing compatibility is always obtained for every color shade within a wide color shade range obtainable by blending these three primary dyes.

In blending at least nine dyes to prepare a blended dye composition according to the method of the present invention, a combination of disperse dyes having a high sublimation resistance (so-called high energy type dyes) produces three primary dye compositions which have high sublimation resistance, good compatibility and good levelness, while a combination of levelling type disperse dyes (so-called low energy type dyes) produces three primary dye compositions which have good covering property, good migration property and good compatibility, and permit easy dyeing with extremely superior reproducibility.

Further, when high energy type dyes and low energy type dyes are blended for each of the three primary colors while being well balanced, three general-purpose primary dyes are obtained having good compatibility, good levelness and a level of fastness which is easy to use in practice.

In blending at least nine dyes to obtain an intermediate color shade, a proportion of one dye which occupies the largest proportion is 60% by weight or less, based on the weight of the composition, and each proportion of the other dyes which occupy the second largest proportion and the third largest proportion therein is 45% by weight or less and 30% by weight or less, respectively, based on the weight of the composition. Also, the sum of the proportions of dyes which occupy the ninth proportion and the subsequent proportions is at least 1% by weight based on the weight of the composition.

In blending three primary dyes according to the method of the present invention, any blending ratio of the dyes may be employed. However, a proportion of one dye in one of the three primary dyes is usually less than 70% by weight based on the weight of the composition and further it is preferred to limit the subtotal of two dyes, wherein one of them occupies the largest proportion and the other occupies the second largest proportion, to less than 90% by weight based on the weight of the composition.

In the present invention, it is a matter of course that the three primary dyes, yellow, red and blue dyes, may be replaced by at least one kind of a mixed dye having an intermediate color shade prepared by blending at least three dyes having extremely different colors from one another, and good dyeing compatibility is also attained, although the range of matchable color shade is somewhat limited as compared with the combination of three primary dyes. Further, it is of course possible to blend at least nine dyes having a similar color.

The fiber materials to be dyed according to the present method include synthetic fiber materials dyeable with conventional disperse dyes, for example, polyester, triacetate, diacetate, polyamide and polyacrylonitrile fibers. Particularly, the method of the present invention is applied effectively to high temperature dyeing and carrier dyeing method for polyester fibers.

According to the method of the present invention, good dyeing compatibility is always obtained irrespective of the blending ratios of component dyes, and the following effects can be obtained.

(1) Levelness is easily obtained and moreover rationalization of dyeing process, for example, short-period dyeing, becomes possible.

(2) Uneven dyeing is difficult to occur as compared with a blend of poor compatibility.

(3) Uneven dyeing is difficult to occur even when the dyeing conditions are somewhat non-uniform.

(4) The dyed materials have only a slight variation in color and depth, when the dyeing is carried out repeatedly, i.e. the reproducibility of dyeing is very good. In the dyeing industry, accomplishment of the combination of dyes having good dyeing compatibility has a very important meaning.

The method of the present invention, which provides the combination of at least nine disperse dyes having constantly good dyeing compatibility irrespective of the blending ratio of the dyes, is a surprising finding which is beyond conventional common sense and at the same time has a very high industrial value.

FIGS. 1 to 9 show a relationship between a dyeing condition (temperature and time) and a ratio of exhaustion on a polyester fiber.

The curves in FIGS. 1 to 9 show the rates of dyeing of various dyes in the temperature-increase type dyeing process. FIGS. 1, 2 and 3 show the rates of dyeing of C.I. Disperse Yellow 51, C.I. Disperse Red 60 and C.I. Disperse Blue 56, respectively. The numerals, (1), (2), (3) and (4), in each Figure mean the cases of 0.1%, 0.5%, 1.0% and 2.0% o.w.f., respectively.

FIGS. 4, 5 and 6 show the cases of the combination dyeings, No. 4, No. 5 and No. 6, respectively, in Example 1. The curves, (5), (6) and (7), are obtained with C.I. Disperse Yellow 51, C.I. Disperse Red 60 and C.I. Disperse Blue 56, respectively.

FIGS. 7, 8 and 9 show the cases of the present combination dyeings having good compatibility, No. 1, No. 2 and No. 3, respectively, in Example 1. The curves, (8), (9) and (10), are obtained with yellow A, red A and blue A, respectively.

The method of the present invention will be illustrated with reference to the following examples, in which all parts are expressed by weight unless otherwise indicated.

EXAMPLE 1

As three primary dyes having good dyeing compatibility, yellow A, red A and blue A were prepared according to the following recipes.

| Yellow A: | | |
| --- | --- | --- |
| C.I. Disperse Yellow | 5 | 17.0 parts |

-continued

| Yellow A: | | |
|---|---|---|
| " | 49 | 16.6 parts |
| " | 51 | 16.6 parts |
| " | 42 | 16.6 parts |
| " | 64 | 16.6 parts |
| " | 192 | 16.6 parts |
| Total | | 100 parts |

| Red A: | | |
|---|---|---|
| C.I. Disperse Red | 54 | 17.0 parts |
| " | 205 | 16.6 parts |
| " | 60 | 16.6 parts |
| " | 116 | 16.6 parts |
| " | 65 | 16.6 parts |
| " | 132 | 16.6 parts |
| Total | | 100 parts |

| Blue A: | | |
|---|---|---|
| C.I. Disperse Blue | 56 | 17.0 parts |
| " | 26 | 16.6 parts |
| " | 73 | 16.6 parts |
| " | 257 | 16.6 parts |
| " | 301 | 16.6 parts |
| " | 165 | 16.6 parts |
| Total | | 100 parts |

Using the three primary dye blends thus obtained, Tetoron textured fabries were dyed by high-temperature dyeing process according to the following recipes. Every recipe of the three primary dye blends showed good compatibility. The curves in FIGS. 7, 8 and 9 show the dyeing rates of the respective recipes.

Table 1

| Dyes | No. 1 | No. 2 | No. 3 |
|---|---|---|---|
| Yellow A | 1.0% owf | 0.5% owf | 0.5% owf |
| Red A | 0.5% owf | 0.5% owf | 0.3% owf |
| Blue A | 0.2% owf | 0.5% owf | 2.0% owf |

For comparison, Tetoron textured fabrics were dyed by high-temperature dyeing process according to the following recipes. In the recipes, C.I. Disperse Yellow 51, C.I. Disperse Red 60 and C.I. Disperse Blue 56 are those which are widely used as levelling type three primary dyes for polyester fibers. As a result, the recipe No. 5 had slightly good dyeing compatibility but the other two recipes had very poor dyeing compatibility. The curves in FIGS. 4, 5 and 6 show the dyeing rates of the respective recipes.

Table 2

| Dyes | No. 4 | No. 5 | No. 6 |
|---|---|---|---|
| C.I. Disperse Yellow 51 | 1.0% owf | 0.5% owf | 0.5% owf |
| C.I. Disperse Red 60 | 0.5% owf | 0.5% owf | 0.3% owf |
| C.I. Disperse Blue 56 | 0.2% owf | 0.5% owf | 2.0% owf |

Polyester spun yarn cheese was dyed by cheese dyeing process using the recipe No. 1. The dyeing conditions were as follows:

Amount of flow: 30 l/kg/min
Direction of circulation of bath liquor: one-way flow in→out
Increase in temperature: 50° C.→130° C., 2° C./min
Holding of temperature: 130° C.×30 min As a result, it was found that the differences in depth and color between the dyed yarns in the inner part of the cheese and those in the outer part of the cheese were very slight and therefore level dyeing was obtained. Also, when the cheese dyeing was carried out using the recipe No. 4, the differences in depth and color between the dyed yarns in the inner part and those in the outer part were very large. It meant that unlevel dyeing occurred.

EXAMPLE 2

As three primary dyes having good compatibility, yellow B, red B and blue B were prepared according to the following recipes.

| Yellow B | | |
|---|---|---|
| C.I. Disperse Yellow | 5 | 20 parts |
| " | 42 | 20 parts |
| " | 64 | 20 parts |
| " | 66 | 15 parts |
| " | 83 | 15 parts |
| " | 103 | 10 parts |
| Total | | 100 parts |

| Red B: | | |
|---|---|---|
| C.I. Disperse Red | 43 | 20 parts |
| " | 60 | 20 parts |
| " | 73 | 15 parts |
| " | 88 | 20 parts |
| " | 92 | 10 parts |
| " | 135 | 15 parts |
| Total | | 100 parts |

| Blue B | | |
|---|---|---|
| C.I. Disperse Blue | 26 | 10 parts |
| " | 27 | 20 parts |
| " | 56 | 15 parts |
| " | 87 | 20 parts |
| " | 128 | 15 parts |
| " | 139 | 20 parts |
| Total | | 100 parts |

Tetoron textured fabrics were dyed by a high-temperature dyeing process in the following blending ratios of these dye blends. As a result, good compatibility and levelness were obtained in every case.

Table 3

| No. | Yellow B | Red B | Blue B | Color at 90° C. during dyeing | Color after dyeing at 130° C. × 30 min | Compatibility |
|---|---|---|---|---|---|---|
| 7 | 2.0% | 1.0% | 0.5% | Khaki | Khaki | Good |
| 8 | 2.0% | 0.5% | 1.0% | Olive | Olive | Good |

Table 3-continued

| No. | Yellow B | Red B | Blue B | Color at 90° C. during dyeing | Color after dyeing at 130° C. × 30 min | Compatibility |
|-----|----------|-------|--------|-------------------------------|----------------------------------------|---------------|
| 9   | 1.0%     | 2.0%  | 0.5%   | Reddish brown                 | Reddish brown                          | Good          |
| 10  | 0.5%     | 1.0%  | 2.0%   | Dark blue                     | Dark blue                              | Good          |
| 11  | 1.0%     | 1.0%  | 1.0%   | Yellowish gray                | Yellowish gray                         | Good          |

For comparison, combination dyeings were carried out using C.I. Disperse Yellow 64, C.I. Disperse Red 60 and C.I. Disperse Blue 56 which are widely used as three primary dyes for high-temperature dyeing of polyester fibers. As described below, the No. 16 (gray-recipe) alone gave good compatibility, but other recipes gave poor compatibility.

Table 4

| No. | Disperse Yellow 64 | Disperse Red 60 | Disperse Blue 56 | Color at 90° C. during dyeing | Color after dyeing at 130° C. × 30 min | Compatibility |
|-----|--------------------|-----------------|-------------------|-------------------------------|----------------------------------------|---------------|
| 12  | 2.0%               | 1.0%            | 0.5%              | Bluish gray                   | Khaki                                  | Poor          |
| 13  | 2.0%               | 0.5%            | 1.0%              | Bluish gray                   | Olive                                  | Poor          |
| 14  | 1.0%               | 2.0%            | 0.5%              | Bluish gray                   | Reddish brown                          | Poor          |
| 15  | 0.5%               | 1.0%            | 2.0%              | Bluish gray                   | Dark blue                              | Slightly poor |
| 16  | 1.0%               | 1.0%            | 1.0%              | Bluish gray                   | Gray                                   | Good          |

Polyester textured fabric was dyed in a jet type dyeing machine under the following conditions using recipe No. 8.

Dyeing conditions:

Cloth circulation speed: 90 m/min
Circulation time: 2.7 min/cycle
Increase in temperature:
    50° C.→100° C., 3° C./min
    100° C.→130° C., 1° C./min
Holding of temperature: 130° C.×30 min As a result, the dyed material had good uniformity and levelness. For comparison, the dyeing procedure was carried out in the same manner as above using recipe No. 13, having poor compatibility. As a result, a dyed material having spots and poor levelness was obtained.

Another dyeing procedure was carried out in the same manner as in Example 2 except that yellow B, red B and blue B were replaced by yellow B', red B' and blue B' prepared as follows, respectively. In this combination of the three primary dyes, yellow B', red B' and blue B', eight dyes having a single chemical structure were present in the dyeing bath. As a result, the effect of the present invention was not obtained and dyeing compatibility was poor.

Yellow B':
| C.I. Disperse Yellow | 5  | 30 parts |
|                      | 42 | 40 parts |
|                      | 66 | 30 parts |

Red B':
| C.I. Disperse Red | 43  | 50 parts |
|                   | 135 | 50 parts |

Blue B':
| C.I. Disperse Blue | 27  | 40 parts |
|                    | 87  | 30 parts |
|                    | 139 | 30 parts |

EXAMPLE 3

As three primary dyes having good dyeing compatibility, yellow C, red C and blue C were prepared according to the following recipes.

Yellow C:
| C.I. Disperse Yellow | 192 | 50 parts |
|                      | 60  | 40 parts |
|                      | 42  | 10 parts |
| Total                |     | 100 parts |

Red C:
| C.I. Disperse Red | 190 | 40 parts |
|                   | 191 | 30 parts |
|                   | 54  | 30 parts |
| Total             |     | 100 parts |

Blue C:
| C.I. Disperse Blue | 73  | 40 parts |
|                    | 301 | 30 parts |
|                    | 56  | 30 parts |
| Total              |     | 100 parts |

Tetoron textured fabrics were dyed by the high-temperature dyeing process in the following blending ratios of these dye blends. As a result, good compatibility and levelness were obtained in every case.

Table 5

| No. | Yellow C | Red C | Blue C | Color at 90° C. during dyeing 130° C.×30 min | Color after dyeing at bility | Compati- |
|---|---|---|---|---|---|---|
| 17 | 2.0% | 1.0% | 0.5% | Khaki | Khaki | Good |
| 18 | 2.0% | 0.5% | 1.0% | Olive | Olive | Good |
| 19 | 1.0% | 2.0% | 0.5% | Reddish brown | Reddish brown | Good |
| 20 | 0.5% | 1.0% | 2.0% | Dark blue | Dark blue | Good |
| 21 | 1.0% | 1.0% | 1.0% | Gray | Gray | Good |

EXAMPLE 4

As a dye for combination dyeing having good compatibility, a mixed brown dye was prepared by the following recipe.

| Brown A: | | |
|---|---|---|
| C.I. Disperse Yellow | 64 | 18 parts |
| " | 42 | 10 parts |
| C.I. Disperse Orange | 13 | 8 parts |
| " | 30 | 20 parts |
| C.I. Disperse Red | 54 | 10 parts |
| " | 190 | 10 parts |
| " | 74 | 8 parts |
| C.I. Disperse Blue | 72 | 6 parts |
| " | 73 | 8 parts |
| " | 54 | 2 parts |
| Total | | 100 parts |

The brown dye thus obtained was blended with the three primary dyes obtained in Example 3 according to the following recipes and used for dyeing polyester fabrics. As a result, good compatibility was obtained in every case.

| No. 22 | { Brown A | 0.8 % | } (gray) |
|---|---|---|---|
|  | { Blue C | 0.4 % | |
| No. 23 | { Brown A | 0.3 % | } (olive) |
|  | { Yellow C | 0.2 % | |
|  | { Blue C | 0.3 % | |
| No. 24 | { Brown A | 1.3% | } (khaki) |
|  | { Yellow C | 0.5 % | |
|  | { Red C | 0.2 % | |

EXAMPLE 5

The following dye compositions were prepared respectively using each dye having the formula described below which had been processed as in a commercially available disperse dye.

| Yellow D: | | |
|---|---|---|
| C.I. Disperse Yellow | 160 | 25 parts |
| C.I. Disperse Yellow | 42 | 25 parts |
| " | 8 | 25 parts |
| " | 5 | 25 parts |

| Red D: | | |
|---|---|---|
| C.I. Disperse Red | 54 | 50 parts |
| " | 88 | 25 parts |
| " | 60 | 25 parts |

| Blue D: | | |
|---|---|---|
| C.I. Disperse Blue | 224 | 25 parts |
| " | 56 | 25 parts |
| " | 60 | 25 parts |
| " | 64 | 25 parts |

Polyester spun yarn cheese was dyed under the following dyeing conditions to obtain a uniform brown dyeing. Compatibility was good, so that the color shade from beginning to end was consistent, and no difference in color was observed between the inside and outside of the cheese.

Dyeing conditions:
Blend Yellow D 1.0% o.w.f.
Red D 0.5% o.w.f.
Blue D 0.25% o.w.f.
Assistant Sumipon TF (anionic surfactant 1 g/l produced by Sumitomo Chemical Co. Ltd.)

pH 5 { Sodium acetate 1 g/l }
     { Acetic acid 0.25 g/l }

Bath ratio 1 : 15
Temperature from room temperature to 100° C. : 3° C./min.
from 100° C. to 130° C. : 1° C./min.
Circulation of bath liquor 30 l/kg/min.

What is claimed is:

1. A method for dyeing a hydrophobic fiber material, which comprises contacting said fiber material with a dye containing a combination of at least nine disperse dyes having different chemical structures from one another, wherein the combination comprises at least two primary-color dye compositions selected from the primary colors yellow, red, and blue, each of said selected primary-color dye compositions comprising at least one disperse dye.

2. The method according to claim 1, wherein the combination comprises at least nine disperse dyes selected from the group consisting of disperse dyes of the formulae (1) to (12), the formula (1) being

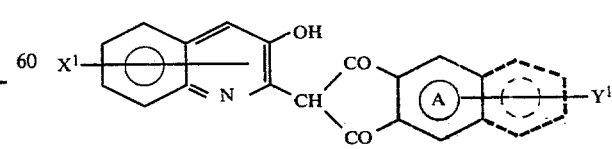

wherein $X^1$ is hydrogen or halogen, $Y^1$ is hydrogen, $C_1$-$C_4$alkyl, $C_1$-$C_4$alkoxy or —$COOR^1$ in which $R^1$ is $C_1$-$C_4$alkyl, and A is benzene or naphthalene nucleus, the formula (2) being

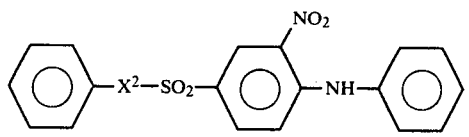

wherein $X^2$ is —NHCH$_2$— or —NH—, the formula (3) being

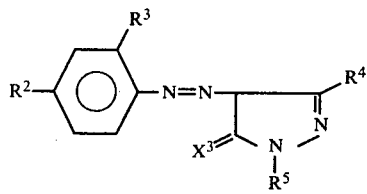

wherein $R^2$ and $R^3$ may be the same or different and are each hydrogen, halogen, —CN, —NO$_2$, C$_1$-C$_4$alkyl, —SO$_2$R$^6$ or —COOR$^6$ in which R$^6$ is C$_1$-C$_4$alkyl, R$^4$ is C$_1$-C$_4$alkyl, phenyl unsubstituted or substituted by halogen, C$_1$-C$_4$alkyl, C$_1$-C$_4$alkoxy, —COOR$^7$ in which R$^7$ is C$_1$-C$_4$alkyl, —NH$_2$ or —NHCOOR$^8$ in which R$^8$ is C$_1$-C$_4$alkyl, R$^5$ is hydrogen, C$_1$-C$_4$alkyl,

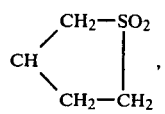

—CH$_2$CH(OR$^9$)CH$_2$OR$^{10}$ in which R$^9$ is hydrogen, C$_1$-C$_4$alkyl or —COCH$_3$, and R$^{10}$ is C$_1$-C$_4$alkyl or phenyl unsubstituted or substituted by C$_1$-C$_4$alkyl, C$_1$-C$_4$alkoxy or halogen, and X$^3$ is oxygen or imino, the formula (4) being

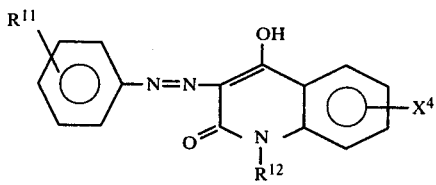

wherein R$^{11}$ is hydrogen or —NO$_2$, R$^{12}$ is hydrogen or C$_1$-C$_4$alkyl, and X$^4$ is hydrogen or halogen, the formula (5) being

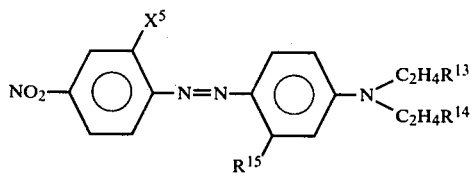

wherein R$^{13}$ and R$^{14}$ may be the same or different and are each hydrogen, hydroxy, cyano, C$_1$-C$_3$alkyl, C$_1$-C$_4$alkoxy, —OCOR$^{16}$, —OCOOR$^{16}$ in which R$^{16}$ is C$_1$-C$_4$alkyl or phenyl, or phenyl unsubstituted or substituted by halogen, hydroxy, C$_1$-C$_4$alkyl or C$_1$-C$_4$alkoxy, R$^{15}$ is hydrogen, C$_1$-C$_4$alkyl or —NHCOR$^{17}$ in which R$^{17}$ is C$_1$-C$_4$alkyl or phenyl, and X$^5$ is halogen or cyano, the formula (6) being

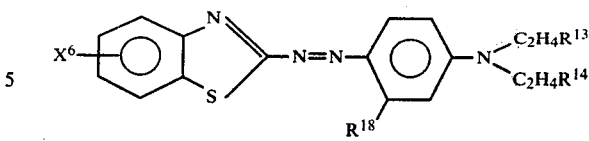

wherein R$^{13}$ and R$^{14}$ are as defined above, R$^{18}$ is C$_1$-C$_4$ alkyl, and X$^6$ is 1 to 3 halogens, nitro, —SO$_2$CH$_3$ or —SCN, the formula (7) being

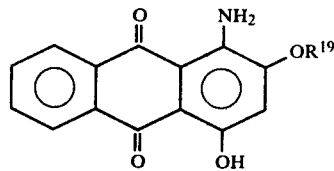

wherein R$^{19}$ is C$_1$-C$_6$alkyl, hydroxy-C$_1$-C$_6$ alkyl,

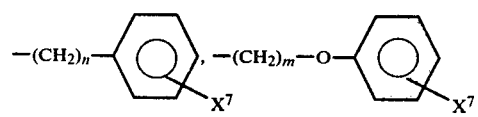

wherein n is an integer of 1 to 4, m is an integer of 1 to 4 and X$^7$ is hydrogen, hydroxy, halogen, C$_1$-C$_4$ alkyl, C$_1$-C$_4$ alkoxy or hydroxyC$_1$-C$_4$alkyl, or phenyl unsubstituted or substituted by halogen, hydroxy, C$_1$-C$_4$ alkyl, C$_1$-C$_4$alkoxy, hydroxyC$_1$-C$_4$alkyl, —OCOR$^{20}$ in which R$^{20}$ is C$_1$-C$_6$ alkyl, —(CH$_2$)$_{n'}$—COOR$^{21}$, —O—(CH$_2$)$_{n'}$—COOR$^{21}$ in which R$^{21}$ is C$_1$-C$_4$ alkyl and n' is an integer of 1 to 4,

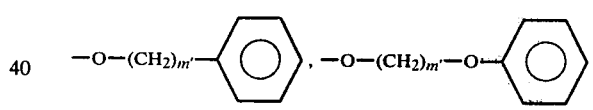

in which m' is an integer of 1 to 4, —S—(CH$_2$)$_{n''}$OR$^{22}$, —SO$_2$NH(CH$_2$)$_{n''}$OR$^{22}$ in which R$^{22}$ is hydrogen or C$_1$-C$_4$alkyl, and n'' is an integer of 1 to 4,

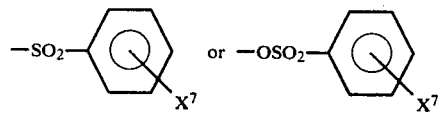

in which X$^7$ is as defined above, the formula (8) being

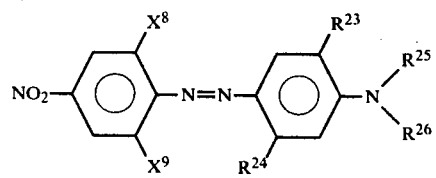

wherein R$^{23}$ is hydrogen, C$_1$-C$_4$alkyl or C$_1$-C$_4$alkoxy, R$^{24}$ is —NHCOR$^{27}$ in which R$^{27}$ is C$_1$-C$_4$ alkyl or phenyl, R$^{25}$ and R$^{26}$ may be the same or different and are each hydrogen, C$_1$-C$_6$alkyl, hydroxy-C$_1$-C$_6$alkyl, —(CH$_2$)$_{n'''}$OR$^{28}$, —(CH$_2$)$_{n'''}$OCOR$^{28}$, —(CH$_2$)$_{n'''}$OCOOR$^{28}$ in which R$^{28}$ is hydrogen, C$_1$-C$_4$alkyl or phenyl and n′″ is an integer of 1 to 4, —(CH$_2$)$_{n''''}$CH(OR$^{29}$)(CH$_2$)$_{m'''}$OR$^{30}$ in which R$^{29}$ is hydrogen, C$_1$-C$_4$alkyl or phenyl, R$^{30}$ is hydrogen, C$_1$-C$_4$alkyl or phenyl, and n″″ and m′″ are each an integer of 1 to 4, X$^8$ is halogen, cyano or nitro, and X$^9$ is cyano, halogen or nitro, the formula (9) being

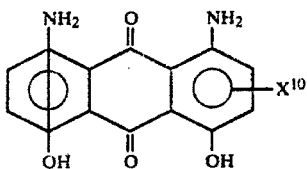

wherein X$^{10}$ is halogen or

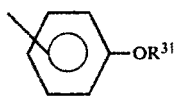

in which R$^{31}$ is C$_1$-C$_4$alkyl, acyl, —COR$^{32}$ or —CONHR$^{32}$ in which R$^{32}$ is C$_1$-C$_4$alkyl or phenyl, the formula (10) being

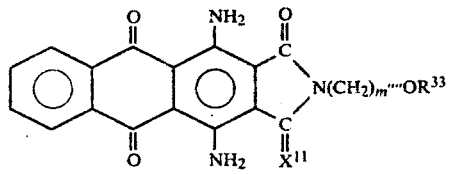

wherein R$^{33}$ is C$_1$-C$_6$alkyl, hydroxy-C$_1$-C$_6$alkyl or phenyl, X$^{11}$ is oxygen or imino, and m″″ is an integer of 1 to 6, the formula (11) being

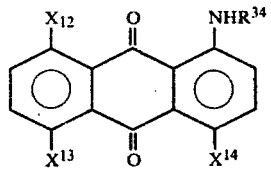

wherein R$^{34}$ is C$_1$-C$_4$ alkyl or phenyl unsubstituted or substituted by halogen, C$_1$-C$_4$ alkyl, C$_1$-C$_4$ alkoxy or hydroxy-C$_1$-C$_4$ alkyl, and X$^{12}$, X$^{13}$ and X$^{14}$ may be the same or different and are each hydrogen, hydroxy, amino, nitro or NHR$^{34}$ in which R$^{34}$ is as defined above, and

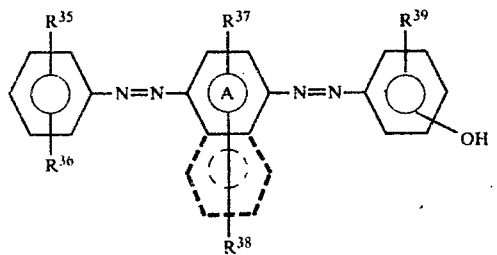

wherein R$^{35}$ and R$^{36}$ may be the same or different and are each hydrogen, hydroxy, C$_1$-C$_4$alkyl, C$_1$-C$_4$alkoxy, nitro or halogen, R$^{37}$, R$^{38}$ and R$^{39}$ may be the same or different and are each hydrogen, C$_1$-C$_4$alkyl or C$_1$-C$_4$alkoxy, and A is as defined above.

3. A method for dyeing a hydrophobic fiber material, which comprises contacting said fiber material with a dye bath containing a combination of at least nine disperse dyes having different chemical structures from one another, wherein the combination comprises yellow, red, and blue primary-color dye compositions, which compositions comprise at least three yellow, three red, and three blue disperse dyes, respectively.

4. The method according to claim 3, wherein said red disperse dyes are selected such that (1) all of said red disperse dyes give a dyed hydrophobic fiber material of a dominant wavelength of 600 to 770 nm or a complementary wavelength of less than 560 nm to CIE illuminant C in the 1931 CIE system, or (2) at least one of said red disperse dyes gives a dyed hydrophobic fiber material of a dominant wavelength of 600 to 770 nm, and the other red disperse dye or dyes gives a dyed hydrophobic fiber material having a complementary wavelength of less than 560 nm to CIE illuminant C in the 1931 CIE system.

5. The method according to claim 3, wherein said yellow disperse dyes are selected such that all of said yellow disperse dyes give a dyed hydrophobic fiber material of a dominant wavelength of 560 to 600 nm to CIE illuminant C in the 1931 CIE system.

6. The method according to claim 1, wherein the proportion of the disperse dye which occupies the largest proportion in the combination is 60% by weight or less, based on the weight of the combination, and the proportions of the disperse dyes which occupy the second largest proportion and the third largest proportion in the combination are 45% by weight or less and 30% by weight or less, respectively, based on the weight of the combination.

7. The method according to claim 3, wherein the proportion of the disperse dye which occupies the largest proportion in each of the three primary-color dye compositions is less than 70% by weight based on the weight of each of the primary-color dye compositions, respectively, and the proportion of the two disperse dyes which occupy the largest and the second largest proportions in each of the primary-color dye compositions is less than 90% by weight, based on the weight of each of the primary-color dye compositions, respectively.

8. The method according to claim 1, wherein the contacting is conducted under conditions employed in high-temperature dyeing and carrier dyeing.

9. A hydrophobic fiber material dyes by the method of claim 1.

10. A dye composition comprising at least nine disperse dyes having different chemical structures from one another, wherein the composition comprises at least two primary-color dye compositions selected from yellow, red, and blue, each of said selected primary-color dye compositions comprising at least one disperse dye.

11. The method according to claim 3, wherein said blue disperse dyes are selected such that (1) all of said blue disperse dyes give a dyed hydrophobic fiber material of a dominant wavelength of 495 to 380 nm or a complementary wavelength of more than 560 nm to CIE illuminant C in the 1931 CIE system, or (2) at least one of said blue disperse dyes gives a dyed hydrophobic fiber material of a dominant wavelength of 495 to 380 nm, and the other blue disperse dye or dyes gives a dyed hydrophobic fiber material having a complementary wavelength of more than 560 nm to CIE illuminant C in the 1931 CIE system.

12. A method for dyeing a hydrophobic fiber material, which comprises contacting said fiber material with a dye bath containing a combination of at least nine disperse dyes having different chemical structures from one another, wherein the combination comprises at least one yellow, one red, and one blue disperse dye.

* * * * *

UNITED STATES PATENT AND TRADEMARK OFFICE
CERTIFICATE OF CORRECTION

PATENT NO. : 4,185,959
DATED : January 29, 1980
INVENTOR(S) : Kunihiko IMADA et al It is certified that error appears in the above—identified patent and that said Letters Patent is hereby corrected as shown below:

Claim 1, Line 3 (Column 14, Line 46), after "dye", insert -- bath --.

Signed and Sealed this

Second Day of February 1982

[SEAL]

Attest:

Attesting Officer

GERALD J. MOSSINGHOFF

Commissioner of Patents and Trademarks